(12) United States Patent
Wang et al.

(10) Patent No.: US 11,245,483 B2
(45) Date of Patent: Feb. 8, 2022

(54) PACKET PROCESSING METHOD AND NETWORK DEVICE

(71) Applicant: Huawei Technologies Co., Ltd., Shenzhen (CN)

(72) Inventors: Jinhui Wang, Dongguan (CN); Liqing Chen, Shenzhen (CN); Hongwei Niu, Chengdu (CN); Yunlei Qi, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 161 days.

(21) Appl. No.: 16/797,225

(22) Filed: Feb. 21, 2020

(65) Prior Publication Data
US 2020/0195363 A1 Jun. 18, 2020

Related U.S. Application Data

(63) Continuation of application No. PCT/CN2017/098685, filed on Aug. 23, 2017.

(51) Int. Cl.
*H04J 3/06* (2006.01)

(52) U.S. Cl.
CPC ............ *H04J 3/0644* (2013.01); *H04J 3/067* (2013.01); *H04J 3/0667* (2013.01); *H04J 3/0697* (2013.01); *H04J 3/0682* (2013.01)

(58) Field of Classification Search
CPC ...... H04J 3/0667; H04J 3/0682; H04J 3/0673; H04J 3/0697; H04J 3/0658; H04J 3/0661;
(Continued)

(56) References Cited

U.S. PATENT DOCUMENTS 10,135,601 B1 * 11/2018 Beardsley .......... H04L 65/4069
2005/0207387 A1 9/2005 Middleton et al.
(Continued)

FOREIGN PATENT DOCUMENTS

CN 102447745 A 5/2012
CN 103929293 A 7/2014
(Continued)

OTHER PUBLICATIONS

Mallela et al., "Timing models for PTP in Ethernet networks" (Year: 2017).*

(Continued)

*Primary Examiner* — Jae Y Lee
*Assistant Examiner* — Aixa A Guadalupe Cruz
(74) *Attorney, Agent, or Firm* — Conley Rose, P.C.

(57) ABSTRACT

A packet processing method includes receiving a first packet by a first receiving interface of a media conversion module of a first network device, where the first packet includes a first alignment marker (AM), sending a second packet by a first sending interface of the media conversion module, where the second packet includes the first AM, and the second packet is the first packet processed by the media conversion module, and calculating a time interval $T_1$ between a time at which the media conversion module receives the first packet and a time at which the media (Continued)

conversion module sends the second packet, where the $T_1$ is used to compensate for a first timestamp at which the first network device receives or sends the third packet.

20 Claims, 3 Drawing Sheets

(58) Field of Classification Search
CPC ............... H04J 3/0676; H04W 56/001; H04W 56/0015; H04W 56/0065; H04W 56/004; H04W 56/0055; H04L 43/0852; H04L 43/106
See application file for complete search history.

(56) References Cited

U.S. PATENT DOCUMENTS

| | | | |
|---|---|---|---|
| 2010/0309932 A1 | 12/2010 | Diab et al. | |
| 2013/0071122 A1 | 3/2013 | Sasaki | |
| 2013/0195443 A1* | 8/2013 | Yin | H04J 3/0638 398/25 |
| 2016/0043823 A1 | 2/2016 | Zhao et al. | |
| 2016/0352500 A1* | 12/2016 | Benjamini | H04J 3/0697 |
| 2018/0076949 A1* | 3/2018 | Mayer | H04L 7/0075 |

FOREIGN PATENT DOCUMENTS

| | | |
|---|---|---|
| CN | 105515908 A | 4/2016 |
| CN | 105610535 A | 5/2016 |
| WO | 2007137085 A2 | 11/2007 |
| WO | 2016181198 A1 | 11/2016 |

OTHER PUBLICATIONS

Machine Translation and Abstract of Chinese Publication No. CN105515908, Apr. 20, 2016, 7 pages.
Machine Translation and Abstract of Chinese Publication No. CN105610535, May 25, 2016, 26 pages.
"Part 3: Carrier Sense Multiple Access with Collision Detection (CSMA/CD) Access Method and Physical Layer Specifications, Amendment 3: Data Terminal Equipment (DTE) Power via the Media Dependent Interface (MDI) Enhancements," 802.3at, IEEE Computer Society, Oct. 30, 2009, 141 pages.
"Part 3: Carrier Sense Multiple Access with Collision Detection (CSMA/CD) Access Method and Physical Layer Specifications," 802.3ba, Jun. 22, 2010, 457 pages.
Garner, G., "IEEE 1588 Version 2," ISPCS Ann Arbor'08; Sep. 24, 2008, 89 pages.
Foreign Communication From A Counterpart Application, PCT Application No. PCT/CN2017/098685, English Translation of International Search Report dated Nov. 27, 2017, 2 pages.
Foreign Communication From A Counterpart Application, PCT Application No. PCT/CN2017/098685, English Translation of Written Opinion dated Nov. 27, 2017, 5 pages.
Riesch, C., et al., "Experimental verification of the egress and ingress latency correction in PTP clocks," XP032677617, Sep. 22, 2014, pp. 59-64.
Puhm, A., et al., "Problems and Solutions for Refitting a Sensor Network with IEEE1588 Clock Synchronisation," XP032718773, Sep. 16, 2014, pp. 1-7.

* cited by examiner

S110 — A first network device receives a first packet by using a first receiving interface of a media conversion module of the first network device, where the first packet includes a first alignment marker AM S120 — The first network device sends a second packet by using a first sending interface of the media conversion module, where the second packet includes the first AM, and the second packet is the first packet processed by the media conversion module S130 — The first network device calculates a time interval $T_1$ between a time at which the media conversion module receives the first packet including the first AM and a time at which the media conversion module sends the second packet including the first AM S140 — The first network device receives a third packet by using the first receiving interface, and sends, by using the first sending interface, the third packet processed by the media conversion module S150 — The first network device uses the $T_1$ to compensate for a first timestamp at which the first network device receives or sends the third packet

PACKET PROCESSING METHOD AND NETWORK DEVICE

CROSS-REFERENCE TO RELATED APPLICATIONS

This application is a continuation application of International Application No. PCT/CN2017/098685, filed on Aug. 23, 2017. The disclosure of the aforementioned application is hereby incorporated by reference in its entirety.

TECHNICAL FIELD

This application relates to the network communications field, and in particular, to a packet processing method and a network device in the network communications field.

BACKGROUND

In an existing communications device, most solutions for performing time synchronization between devices are implemented according to a precision time protocol (PTP) standard of a network measurement and control system proposed by the Institute of Electrical and Electronics Engineers (IEEE), and the standard is also referred to as an IEEE 1588 protocol (1588 protocol).

A core idea of the 1588 protocol is to use a master-slave clock mode. During synchronization, a master device periodically issues PTP packets, a slave device receives timestamp information sent by the master device. A master-slave line time delay and a master-slave time offset are calculated based on the timestamp information, and a local time is adjusted using the time offset such that a slave device time is kept consistent with a master device time, to implement time synchronization.

The 1588 protocol requires that a delay between a stamping point and a physical layer medium (PHY), for example, an optical fiber, be stable and that there be no asymmetric delay change. However, in an existing network system, there is an asymmetric link delay, and a key to resolve an asymmetric delay problem is how to obtain the delay. In a plurality of current clock synchronization systems, a delay in a PHY chip is largely considered. However, internal processing, such as first in first out (FIFO), also exists between the stamping point and an egress of a media conversion module, and a delay of the internal processing is uncertain. An existing solution is to estimate a delay of the media conversion module based on internal circuit processing. In this solution, the obtained delay may be inaccurate, resulting in relatively low synchronization performance of the 1588 protocol.

SUMMARY

This application provides a packet processing method and a network device in order to accurately determine a delay of processing a packet by a media conversion module, and help improve synchronization performance of a 1588 protocol.

According to a first aspect, a method for measuring a delay is provided, and the method includes receiving, by a first network device, a first packet using a first receiving interface of a media conversion module of the first network device, where the first packet includes a first alignment marker (AM), sending, by the first network device, a second packet using a first sending interface of the media conversion module, where the second packet includes the first AM, and the second packet is the first packet processed by the media conversion module, calculating, by the first network device, a time interval $T_1$ between a time at which the media conversion module receives the first packet including the first AM and a time at which the media conversion module sends the second packet including the first AM, and receiving, by the first network device, a third packet using the first receiving interface, and sending, using the first sending interface, the third packet processed by the media conversion module, where the first network device uses the $T_1$ to compensate for a first timestamp at which the first network device receives or sends the third packet.

A time interval of a packet before and after the packet passes through the media conversion module is recorded, and the time interval is used to correct a timestamp of sending or receiving the packet. This can accurately determine a delay of the packet through internal processing of the media conversion module, and further improve synchronization performance of a 1588 protocol.

Optionally, the third packet is a packet received after the first network device receives the first packet using the first receiving interface.

Optionally, the third packet may also be the first packet.

Optionally, the step of calculating the $T_1$ may be performed only once, and the calculated $T_1$ is stored in the first network device. When the third packet needs to be sent or received, the $T_1$ is directly used to compensate for a timestamp at which the third packet is sent or received. In other words, the $T_1$ may be used for a plurality of times for subsequent packets.

Optionally, the media conversion module may be an optical module.

With reference to the first aspect, in some implementations of the first aspect, the method further includes receiving, by the first network device, a fourth packet using a second receiving interface of the media conversion module, where the fourth packet includes a second AM, sending, by the first network device, a fifth packet using a second sending interface of the media conversion module, where the fifth packet includes the second AM, and the fifth packet is the fourth packet processed by the media conversion module, calculating, by the first network device, a time interval $T_2$ between a time at which the media conversion module receives the fourth packet including the second AM and a time at which the media conversion module sends the fifth packet including the second AM, and receiving, by the first network device, a sixth packet using the second receiving interface, and sending, using the second sending interface, the sixth packet processed by the media conversion module, where a receiving direction and a sending direction of the third packet are opposite to those of the sixth packet, and the first network device uses the $T_2$ to compensate for a second timestamp at which the first network device receives or sends the sixth packet.

Optionally, the sixth packet is a packet received after the first network device receives the fourth packet using the second receiving interface.

Optionally, the sixth packet may also be the fourth packet.

In the foregoing method, a delay of internal processing of the media conversion module is used to compensate for timestamps in both the receiving direction and the sending direction. This can further improve the synchronization performance of the 1588 protocol.

Optionally, the receiving interface and the sending interface in this application may be multiplexed, to be specific, it may be understood that the first receiving interface may be the second sending interface, and the first sending interface may be the second receiving interface.

With reference to the first aspect, in some implementations of the first aspect, the calculating, by the first network device, a time interval $T_1$ between a time at which the media conversion module receives the first packet including the first AM and a time at which the media conversion module sends the second packet including the first AM includes recording, by the first network device, a first moment when receiving the first packet using the first receiving interface and when determining that the first packet includes the first AM, recording, by the first network device, a second moment when sending the second packet using the first sending interface and when determining that the second packet includes the first AM, and determining, by the first network device, a time interval between the first moment and the second moment as the time interval $T_1$.

Optionally, the calculating, by the first network device, a time interval $T_1$ between a time at which the media conversion module receives the first packet including the first AM and a time at which the media conversion module sends the second packet including the first AM includes recording moments when the first packet passes through the first receiving interface and the first sending interface of the media conversion module, and determining a time difference between the two recorded moments as the time interval $T_1$.

Optionally, the determining that the first packet includes the first AM and recording the first moment may also be performed by another control device. Similarly, the determining that the second packet includes the first AM and recording the second moment may also be performed by another control device.

With reference to the first aspect, in some implementations of the first aspect, the determining, by the first network device, a time interval between the first moment and the second moment as the time interval $T_1$ includes starting, by the first network device, a counter at the first moment, stopping, by the first network device, the counter at the second moment, and obtaining a count value N, where N is a positive integer, and a clock cycle of the counter is t, and determining N*t as the $T_1$.

Measuring the delay using the counter is simple and easy to implement. The delay measurement method may be implemented by both hardware and software.

Optionally, the count value N of the counter may be reported to a central processing unit (CPU), and the CPU calculates the delay $T_1$.

With reference to the first aspect, in some implementations of the first aspect, the third packet is a packet that is sent by a first service chip of the first network device to a second network device using the media conversion module, and that the first network device uses the $T_1$ to compensate for a first timestamp at which the first network device sends the third packet includes using, by the first network device, a sum of the first timestamp and the $T_1$ as a moment at which the first network device sends the third packet to the second network device, where the first timestamp is a moment at which the third packet arrives at the first receiving interface.

With reference to the first aspect, in some implementations of the first aspect, the third packet is a packet that is sent by a second network device to a second service chip of the first network device using the media conversion module, and that the first network device uses the $T_1$ to compensate for a first timestamp at which the first network device receives the third packet includes using, by the first network device, a difference between the first timestamp and the $T_1$ as a moment at which the first network device receives the third packet, where the first timestamp is a moment at which the third packet arrives at the first sending interface.

With reference to the first aspect, in some implementations of the first aspect, the third packet is a synchronization packet sent by a second network device to the first network device, where the synchronization packet carries a third timestamp at which the second network device sends the synchronization packet. The sixth packet is a delay request packet sent by the first network device to the second network device, where the second network device is a master device of the first network device, and the first network device is a slave device of the second network device. The method further includes obtaining, by the first network device from the synchronization packet, a moment $t_1$ at which the second network device sends the synchronization packet, and that the first network device uses the $T_1$ to compensate for the first timestamp at which the first network device receives the third packet includes using, by the first network device, a difference between the first timestamp and the $T_1$ as a moment $t_2$ at which the first network device receives the synchronization packet, where the first timestamp is a moment at which the synchronization packet arrives at the first sending interface, and that the first network device uses the $T_2$ to compensate for the second timestamp at which the first network device sends the sixth packet includes using, by the first network device, a sum of the second timestamp and the $T_2$ as a moment $t_3$ at which the first network device sends the delay request packet, where the second timestamp is a moment at which the delay request packet arrives at the second receiving interface, and the method further includes receiving, by the first network device, a delay response packet sent by the second network device, where the delay response packet carries a fourth timestamp at which the second network device receives the delay request packet, obtaining, by the first network device from the delay response packet, a moment $t_4$ at which the second network device receives the delay request packet, and calculating, by the first network device, a time offset between the first network device and the second network device based on the $t_1$, the $t_2$, the $t_3$, and the $t_4$.

According to a second aspect, a network device is provided, and is configured to perform the method according to any one of the first aspect or the possible implementations of the first aspect. Further, the network device includes units that are configured to perform the method according to any one of the first aspect or the possible implementations of the first aspect.

According to a third aspect, a network device is provided. The network device includes a network interface, a memory, and a processor. The memory is configured to store a computer program. The processor is configured to invoke and run the computer program from the memory, and when the program is run, the processor performs the method according to any one of the first aspect or the possible implementations of the first aspect.

According to a fourth aspect, a computer storage medium is provided, and is configured to store a computer software instruction used to perform the method according to any one of the first aspect or the possible implementations of the first aspect, and the computer software instruction includes a program designed to perform the foregoing aspects.

According to a fifth aspect, a computer program product including an instruction is provided. When the computer program product is run on a computer, the computer is enabled to perform the method according to any one of the first aspect or the possible implementations of the first aspect.

DESCRIPTION OF EMBODIMENTS

The following describes the embodiments of the present application with reference to accompanying drawings.

In a mobile communications system, to ensure service quality of wireless communications, a communications network and a communications device have a strict requirement for clock synchronization. In particular, with development of a fifth-generation mobile communications technology of the mobile communications network, the mobile communications system also has a stricter requirement for clock synchronization precision. IEEE 1588 was originally generated because precise time control is required in the industrial control field. However, because the IEEE 1588 supports hardware stamping, the IEEE 1588 can obtain high-precision time synchronization of a sub-microsecond μs level. In recent years, the IEEE 1588 was introduced into a telecommunications network by the International Telecommunication Union-Telecommunication Standardization Sector (ITU-T) to provide precise time synchronization for a time division wireless system such as time division-synchronous code division multiple access (TD-SCDMA), code division multiple access 2000 (CDMA 2000), or long term evolution-time division duplex (LTE-TDD).

Figure 1:
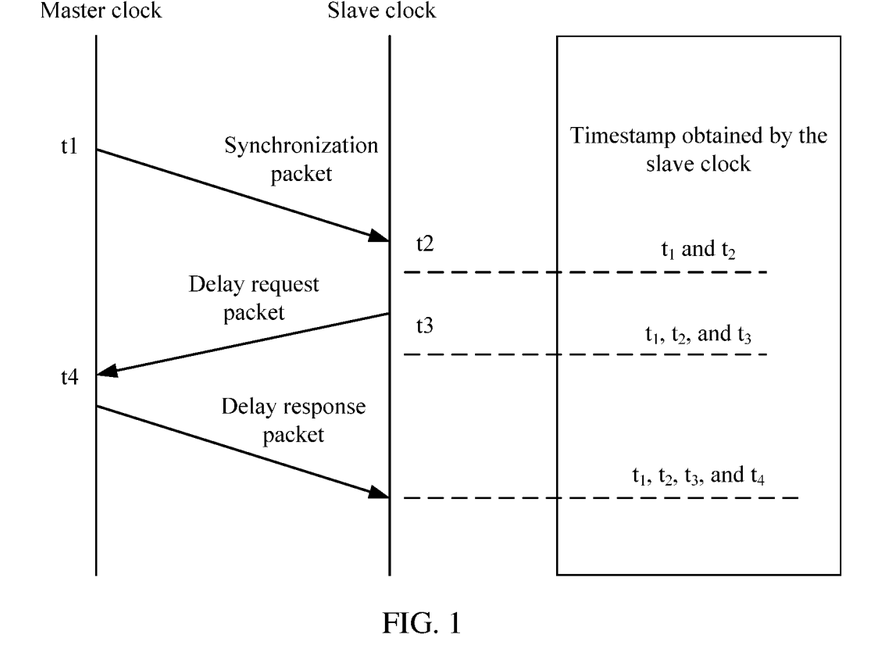
FIG. 1 is a schematic diagram of an IEEE 1588 time synchronization process.

With reference to FIG. 1, the following describes in detail a concept, a term, and a requirement of time synchronization, and a technical principle, a networking scenario, and a deployment consideration of the 1588 protocol from a technical perspective.

FIG. 1 is a schematic diagram of a time synchronization process of a 1588 protocol. Used packets are a synchronization (Sync) packet, a delay request (Delay_Req) packet, and a delay response (Delay_Resp) packet. A master clock sends a Sync packet to a slave clock at a moment $t_1$, where the Sync packet carries a sending time of a $t_1$ timestamp of the Sync packet. The slave clock receives the Sync packet at a moment $t_2$, generates a $t_2$ timestamp locally, and obtains the $t_1$ timestamp from the Sync packet. The slave clock sends a Delay_Req packet to the master clock at a moment $t_3$, and generates a $t_3$ timestamp locally. The master clock receives the Delay_Req packet at a moment $t_4$, and generates a $t_4$ timestamp locally. Then, the master clock adds the $t_4$ timestamp to the Delay_Resp packet, and returns the Delay_Resp packet including the $t_4$ timestamp to the slave clock. The slave clock receives the Delay_Resp packet, and extracts the $t_4$ timestamp from the packet. In this way, the slave clock obtains four timestamps. A master-slave line Delay and a master-slave time Offset can be calculated from the four timestamps. A line delay from the master clock to the slave clock is set to a delay 1, and a line delay from the slave clock to the master clock is set to a delay 2. A calculation process is as follows.

$$T1 + \text{Delay1} + \text{Offset} = T2 \quad (1)$$

$$T3 + \text{Delay2} - \text{Offset} = T4 \quad (2)$$

It is assumed that Delay 1=Delay 2=Delay. The following equations are obtained.

$$\text{Delay} = \frac{[(T2 - T1) + (T4 - T3)]}{2} \quad (3)$$

$$\text{Delay} = \frac{[(T2 - T1) + (T4 - T3)]}{2} \quad (4)$$

The slave clock can adjust time of the slave clock based on a calculated offset value in order to implement synchronization with the master clock. The foregoing calculation is based on an assumption that the link delay from the master clock to the slave clock is equal to the link delay from the slave clock to the master clock.

Figure 2:
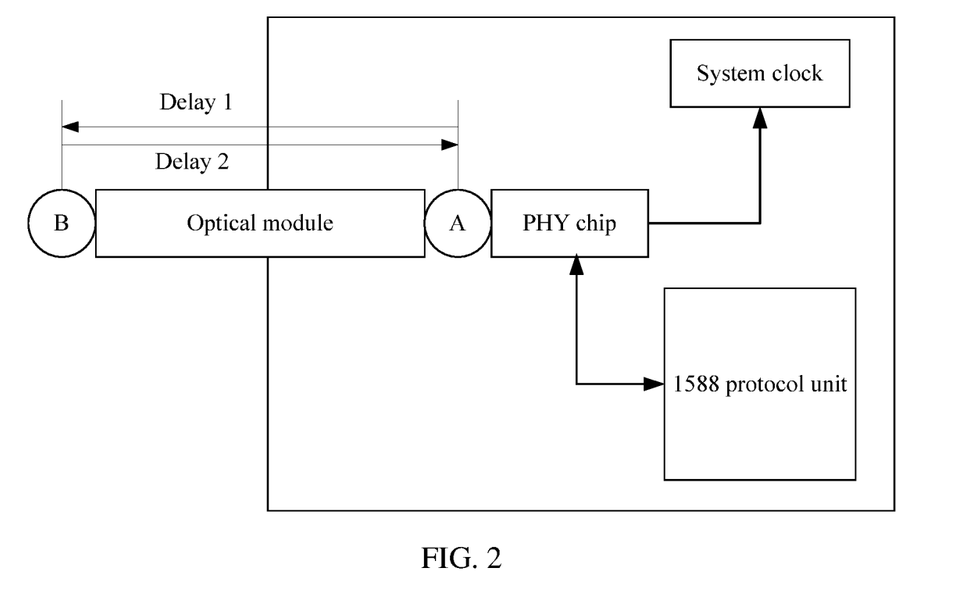
FIG. 2 is a possible scenario diagram applied to an embodiment of this application.

FIG. 2 is a schematic diagram of a possible application scenario according to an embodiment of this application. Further, FIG. 2 is a partial internal structural diagram of a network device. As shown in FIG. 2, the network device includes an optical module, a PHY chip, a system clock, and a 1588 protocol unit, and delays before and after the optical module are a delay 1 and a delay 2 respectively. The following first describes the modules used in FIG. 2.

PHY chip. The PHY may be implemented using a field programmable gate array (FPGA) or an application-specific integrated circuit (ASIC). The PHY may include a serdes, a bit demultiplexer (bit demux) circuit, a first in first out buffer (FIFO buffer), a descrambling circuit, and an aggregation circuit. The PHY may be a component in a network interface card (NIC), and the NIC may be a line card (LC) or a physical interface card (IC). The PHY may be connected to a media access controller (MAC) using a media independent interface (MII). The PHY chip may include one PHY or a plurality of PHYs.

Optical module. In short, the optical module is used for optical-to-electrical conversion. A transmitting interface converts an electrical signal into an optical signal. After the optical signal is transmitted through an optical fiber, a receiving interface converts the optical signal into the electrical signal.

1588 protocol unit 1588 is actually a master-slave synchronization system. In a process of system synchronization, the master clock periodically issues PTP time synchronization and time information, and the slave clock port receives timestamp information sent by the master clock port. The system calculates a master-slave line time delay and a master-slave time offset based on the timestamp information, and adjusts a local time using the time offset such that a frequency and a phase of a slave device time are kept consistent with those of a master device time. The 1588 protocol can simultaneously implement frequency synchronization and phase synchronization.

System clock. Usually, the system clock is a clock system. The system clock is a circuit that includes an oscillator (a signal source), a timing wake-up device, a frequency divider, and the like. The system clock is a pulse of an entire system. Usually, a processor needs to be driven by the clock to complete instruction execution.

Usually, a timestamp generated when the network device sends a packet is completed by a service chip next preceding the media conversion module. Similarly, a timestamp generated when the network device receives a packet is completed by a service chip next following the media conversion module. In other words, actually, the timestamp generated when the network device sends the packet does not consider a time period during which the packet passes through the media conversion module, and a time of actually sending the packet should be later than the timestamp generated when the packet is sent. The timestamp generated when the network device receives the packet does not consider a time period during which the packet passes through the media conversion module. The time of actually receiving the packet should be earlier than the timestamp generated when the packet is received.

Figure 3:
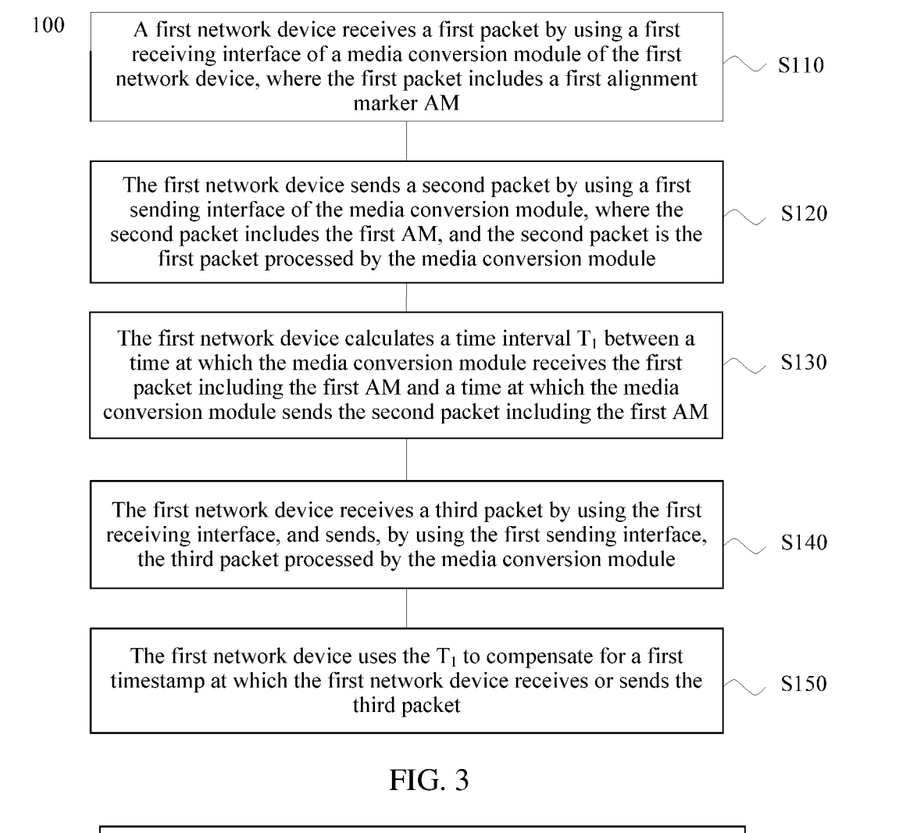
FIG. 3 is a schematic block diagram of a packet processing method according to an embodiment of this application.

FIG. 3 is a schematic block diagram of a packet processing method 100 according to an embodiment of this application. As shown in FIG. 3, the method 100 may be performed by a control unit in a network device. For example, the control unit may be implemented by a CPU or an FPGA. The method 100 includes the following steps.

S110. A first network device receives a first packet using a first receiving interface of a media conversion module of the first network device, where the first packet includes a first AM.

S120. The first network device sends a second packet using a first sending interface of the media conversion module, where the second packet includes the first AM, and the second packet is the first packet processed by the media conversion module.

S130. The first network device calculates a time interval $T_1$ between a time at which the media conversion module receives the first packet including the first AM and a time at which the media conversion module sends the second packet including the first AM.

S140. The first network device receives a third packet using the first receiving interface, and sends, using the first sending interface, the third packet processed by the media conversion module.

S150. The first network device uses the $T_1$ to compensate for a first timestamp at which the first network device receives or sends the third packet.

It should be understood that the media conversion module in this embodiment of this application may be a component that converts one type of signal into another type of signal. For example, the media conversion module may be an optical module. In addition to converting an optical signal into an electrical signal, the optical module may further convert the electrical signal into the optical signal. Alternatively, the media conversion module may further be a microwave intermediate radio frequency module or the like. For ease of understanding, the following uses the optical module as an example to describe the technical solutions in this embodiment of this application in detail. However, this embodiment of this application is not limited thereto.

It should be further understood that, when the $T_1$ is calculated in this embodiment of this application, a data stream may be input into the media conversion module, and the data stream may include a plurality of packets. A person skilled in the art understands that the data stream may be data of a physical layer, and the packet may be data of a MAC layer. The data stream may include a plurality of data blocks, and each data block in the data stream is obtained by performing physical layer encoding on an Ethernet frame stream. An AM is periodically inserted after the physical layer encoding is performed on the Ethernet frame stream. Such a cycle may be referred to as a data cycle. The AM is also a data block. Inserting the AM into the data stream may mean that the AM is included in a packet. For ease of understanding, the following first describes in detail the data block in the data stream.

The physical layer encoding may be 8-bit/10-bit encoding, or may be 64-bit/66-bit encoding. When the physical layer encoding is 8-bit/10-bit encoding, a quantity of bits included in one data block is 10. When the physical layer encoding is 64-bit/66-bit encoding, a quantity of bits included in one data block is 66. In the data block of 10 bits, two bits may be a synchronization header. In the data block of 66 bits, two bits may be a synchronization header.

For example, according to a 100 Gigabit Ethernet (GE) standard in an IEEE 802.3ba, data transmitted in one data cycle may be 16384 data blocks. The 16384 data blocks include the AM and 16383 data blocks. The AM is transmitted before the 16383 data blocks. A quantity of bits included in each of the 16384 data blocks is 64. In other words, usually, the data transmitted in one data cycle includes one AM and a plurality of data blocks, and the plurality of data blocks form a data block group. In other words, after the AM is inserted, data blocks other than the AM in the data transmitted in one data cycle are data blocks in the data block group. In the data transmitted in one data cycle, the quantity of bits included in each of the plurality of data blocks is equal to the quantity of bits included in the AM.

Optionally, steps S110, S120, and S130 may be performed only once, and the calculated $T_1$ is stored in the first network device. When the third packet needs to be sent or received, the $T_1$ may be directly used to compensate for the timestamp at which the third packet is sent or received. In other words, steps S140 and S150 may be performed for a plurality of times.

Optionally, the third packet may be the first packet. In other words, the first network device may compensate, in real time, the timestamp at which the first network device receives or sends the first packet. Further, if the first packet is sent by the first network device to a second network device, the first network device may add, to the first packet at the first sending interface of the media conversion module, an interval between the time at which the first packet arrives at the first receiving interface and the time at which the first packet arrives at the first sending interface such that the second network device can calculate an accurate moment at which the first network device sends the first packet.

Optionally, the third packet may further be a packet received after the first network device receives the first packet using the second receiving interface. In an embodiment, the first network device may calculate a delay in advance, and perform compensation in a subsequent packet. This example is used to describe this application in the following, but this embodiment of this application is not limited thereto.

Therefore, according to the method for measuring a delay in this embodiment of this application, a time interval before and after a packet passes through the media conversion module is recorded, and the time interval is used to correct a timestamp of sending or receiving a packet. This can accurately determine the delay of the packet through internal processing of the media conversion module, and further improve synchronization performance of a 1588 protocol.

Optionally, in this embodiment of this application, the calculating, by the first network device, a time interval $T_1$ between a time at which the media conversion module receives the first packet including the first AM and a time at which the media conversion module sends the second packet including the first AM includes recording, by the first network device, a first moment when receiving the first packet using the first receiving interface and when determining that the first packet includes the first AM, recording, by the first network device, a second moment when sending the second packet using the first sending interface and when determining that the second packet includes the first AM, and determining, by the first network device, a time interval between the first moment and the second moment as the time interval $T_1$.

Further, the first network device may start a counter at the first moment. The first network device may stop the counter at the second moment, and obtain a count value N, where N is a positive integer, and a clock cycle of the counter is t. Further, the first network device may determine N*t as the $T_1$. It should be understood that the clock cycle t of the counter may mean that the count value is increased by 1 at an interval of a time t.

Measuring the delay using the counter is simple and easy to implement. The delay measurement method may be implemented by both hardware and software.

Figure 4:
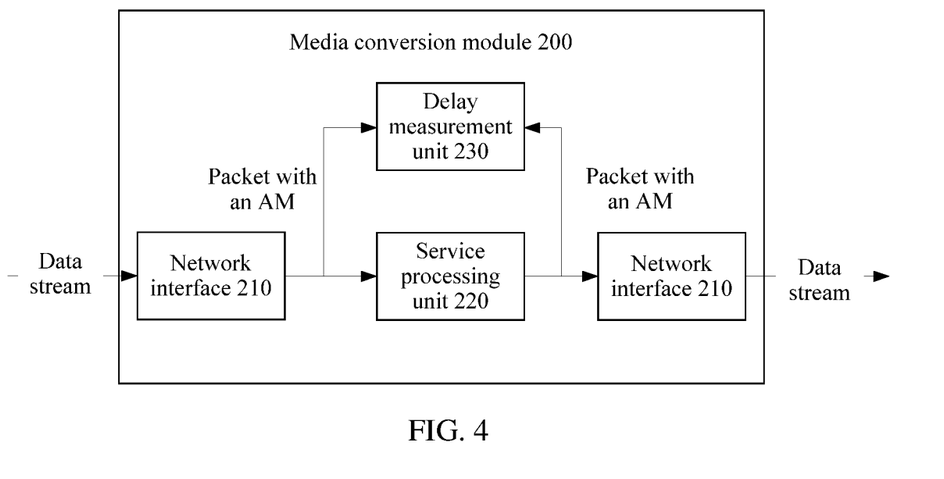
FIG. 4 is a schematic block diagram of a media conversion module according to an embodiment of this application.

A media conversion module 200 of the network device in FIG. 4 is used as an example to describe the technical solutions in this embodiment of this application in detail. As shown in FIG. 4, the media conversion module 200 includes at least a network interface 210, a service processing unit 220, and a delay measurement unit 230. The media conversion module 200 may be configured to perform some or all of the steps or the procedures of the method 100 for measuring a delay in this embodiment of this application. For example, when a data stream needs to enter the inside of the media conversion module 200, a processing requirement of the service processing unit 220 is that parallel-to-serial conversion of data usually needs to be performed using the network interface 210. For example, the network interface may be a serdes interface, and the serdes interface may be either a serializer or a deserializer. Parallel-to-serial conversion is a mainstream time-division multiplexing (TDM) and peer-to-peer (P2P) serial communications technology. In an embodiment, a plurality of low rate parallel signals are converted into high rate serial signals at a transmit end, and high rate serial signals are transmitted through a transmission medium (an optical cable or a copper wire). Finally, the high rate serial signals are converted back into low rate parallel signals at a receive end. The data stream after the parallel-to-serial conversion may be a data stream into which an AM has been inserted. It should be understood that, inserting the AM into the data stream may be performed by the media conversion module 200, or may be performed by a service chip before the data stream flows into the media conversion module 200. This is not limited in this embodiment of this application. Further, a data stream that passes through the network interface 210 may be bypassed to the delay measurement unit 230. The delay measurement unit 230 may identify a specific AM in the data stream. At the same time, the data stream is further processed by the service processing unit 220, and before the data stream flows out of the network interface 210, the data stream is bypassed to the delay measurement unit 230 again, and the specific AM is identified again. At moments at which the delay measurement unit 230 identifies the specific AM twice, the delay measurement unit 230 may respectively generate two pulse signals, and the two pulse signals are recorded as an FP1 and an FP2 respectively. A timer may be started inside the delay measurement unit 230, and the FP1 and the FP2 are used as a start and an end of the timer. A time recorded by the timer at an end moment may be a delay during which the data stream passes through the service processing unit 220.

Alternatively, a high-frequency counter may be started inside the delay measurement unit 230. Similarly, the FP1 and the FP2 are used as a start and an end of the counter, and a product of a value recorded by the high-frequency counter at an end moment and a cycle of the high-frequency counter may be used as a delay during which the data stream passes through the service processing unit 220. Finally, the delay measured by the delay measurement unit 230 may be used to correct a timestamp at which the network device receives or sends some packets.

Optionally, in this embodiment of this application, the method further includes receiving, by the first network device, a fourth packet using a second receiving interface of the media conversion module, where the fourth packet includes a second AM, sending, by the first network device, a fifth packet using a second sending interface of the media conversion module, where the fifth packet includes the second AM, and the fifth packet is the fourth packet processed by the media conversion module, calculating, by the first network device, a time interval $T_2$ between a time at which the media conversion module receives the fourth packet including the second AM and a time at which the media conversion module sends the fifth packet including the second AM, and receiving, by the first network device, a sixth packet using the second receiving interface, and sending, using the second sending interface, the sixth packet processed by the media conversion module, where a receiving direction and a sending direction of the third packet are opposite to those of the sixth packet, and the first network device uses the $T_2$ to compensate for a second timestamp at which the first network device receives or sends the sixth packet.

Similarly, the sixth packet may be the fourth packet, or the sixth packet is a packet received after the first network device receives the fourth packet using the second receiving interface.

Further, the media conversion module 200 may be a media conversion module of a network device. A delay during which a data stream in either of the receiving direction and the sending direction of the network device passes through the service processing unit 220 in the media conversion module 200 may be measured using the foregoing method 100. For example, the any direction may be the sending direction or the receiving direction. However, a delay during which a data stream in the other direction passes through the service processing unit in the media conversion module 200 may be measured using an existing delay measurement method. For example, the delay of the media conversion module may be estimated based on internal circuit processing. In an embodiment, the method 100 may also be applied in two directions of the network device, to be specific, the method 100 is used in both the receiving direction and the sending direction. This is not limited in this embodiment of this application.

Optionally, the receiving interface and the sending interface in this embodiment of this application may be multiplexed, to be specific, it may be understood that the first receiving interface may be the second sending interface, and the first sending interface may be the second receiving interface. A delay in one direction may be first measured, and then a delay in the other direction is measured.

In the foregoing method, a delay of internal processing of the media conversion module is used to compensate for timestamps in both the receiving direction and the sending direction. This can further improve synchronization performance of a 1588 protocol.

Optionally, in this embodiment of this application, the third packet is a packet that is sent by a first service chip of the first network device to a second network device using the media conversion module, and that the first network device uses the $T_1$ to compensate for a first timestamp at which the first network device sends the third packet includes using, by the first network device, a sum of the first timestamp and the $T_1$ as a moment at which the first network device sends the third packet to the second network device, where the first timestamp is a moment at which the third packet arrives at the first receiving interface.

It should be understood that when the first network device sends the packet to the second network device, the packet first needs to be processed using the service chip in the first network device, and then the processed packet is sent using the media conversion module. In an embodiment, in this embodiment of this application, the third packet may be a packet processed by the first service chip.

Optionally, in this embodiment of this application, the third packet is a packet that is sent by a second network device to a second service chip of the first network device using the media conversion module, and that the first network device uses the $T_1$ to compensate for a first timestamp at which the first network device receives the third packet includes using, by the first network device, a difference between the first timestamp and the $T_1$ as a moment at which the first network device receives the third packet, where the first timestamp is a moment at which the third packet arrives at the first sending interface.

A 1588 clock synchronization system usually includes a master device and a slave device that exchange a packet. In this case, both the master device and the slave device may include the media conversion module 200. In other words, the foregoing method 100 may be used to correct the timestamps of the receiving direction and the sending direction of the master device. The slave device is used as an example. The slave device may use a sum of the measured $T_1$ and the timestamp of sending a packet as a moment of sending the packet to the master device, and the slave device may also use a difference between the measured $T_2$ and the timestamp of receiving the packet as a moment of receiving the packet sent by the master device. Similarly, when sending the packet to the slave device, the master device may add the measured $T_1$ to the packet so that the slave device may calculate an accurate moment at which the master device sends the packet. In this embodiment of this application, using the method 100 to correct the timestamp for any direction of any device in the 1588 clock synchronization system helps improve the synchronization performance of the 1588 protocol.

Optionally, in this embodiment of this application, the third packet is a synchronization packet sent by a second network device to the first network device, where the synchronization packet carries a third timestamp at which the second network device sends the synchronization packet. The sixth packet is a delay request packet sent by the first network device to the second network device, where the second network device is a master device of the first network device, and the first network device is a slave device of the second network device. The method further includes obtaining, by the first network device from the synchronization packet, a moment $t_1$ at which the second network device sends the synchronization packet, and that the first network device uses the $T_1$ to compensate for the first timestamp at which the first network device receives the third packet includes using, by the first network device, a difference between the first timestamp and the $T_1$ as a moment $t_2$ at which the first network device receives the synchronization packet, where the first timestamp is a moment at which the synchronization packet arrives at the first sending interface, and that the first network device uses the $T_2$ to compensate for the second timestamp at which the first network device sends the sixth packet includes using, by the first network device, a sum of the second timestamp and the $T_2$ as a moment $t_3$ at which the first network device sends the delay request packet, where the second timestamp is a moment at which the delay request packet arrives at the second receiving interface, and the method further includes receiving, by the first network device, a delay response packet sent by the second network device, where the delay response packet carries a fourth timestamp at which the second network device receives the delay request packet, obtaining, by the first network device from the delay response packet, a moment $t_4$ at which the second network device receives the delay request packet, and calculating, by the first network device, a time offset between the first network device and the second network device based on the $t_1$, the $t_2$, the $t_3$, and the $t_4$.

It should be understood that the synchronization packet, the delay request packet, and the delay response packet in this embodiment of this application are the same as a Sync packet, a Delay_Req packet, and a Delay_Resp packet in an existing 1588 protocol clock synchronization system. The three types of packets are all event packets, to be specific, are used to generate and communicate timing packets. For a relationship between packets, refer to FIG. 1 and the description of FIG. 1. For brevity, details are not described herein again.

It should be further understood that the foregoing packet types are merely used as an example for description, or may also be packets of another type. This is not limited in this embodiment of this application.

Usually, the foregoing measured delay may be encapsulated in a time correction field in a PTP packet, for example, the time correction field in a format of the PTP packet.

The following briefly describes a clock synchronization process using an example in which the delay measurement method 100 is used for a receiving direction and a sending direction of the master device and the slave device. It is assumed that a timestamp of the Sync packet sent by the master device is $t_1$, a delay in the sending direction measured by the master device using the delay measurement method 100 is T1, a delay in the receiving direction measured by the slave device using the delay measurement method 100 is T2, a timestamp at which the slave device receives the Sync packet is t2, a timestamp at which the slave device sends the Delay_Req packet to the master device is t3, a delay in the sending direction measured by the slave device using the delay measurement method 100 is T3, a delay in the receiving direction measured by the master device using the delay measurement method 100 is T4, and a timestamp at which the master device receives the Delay_Req packet is t4. In this case, the slave device may substitute (t1+T1), (t2−T2), (t3+T3), and (t4−T4) into the foregoing formula (4) to calculate a time offset between the master device and the slave device.

Optionally, in this embodiment of this application, the foregoing data cycle of periodically inserting the AM into the data stream may be greater than a delay of processing the data stream by the service processing unit 220. In this way, two AMs identified at an ingress and an egress respectively are necessarily a same AM. Alternatively, the data cycle may be less than or equal to the delay of processing the data stream by the service processing unit 220. In this case, the periodically inserted AM may be identified. For example, the AM inserted into a same data stream may be sequentially labelled from 0, 1, . . . . The two identified AMs need to be the same AM, that is, AMs having a same label. Further, the same AM separately identified at the ingress and the egress may be a same bit or byte that separately identifies the same AM at the ingress and the egress, for example, may be a first bit. This is not limited in this embodiment of this application, provided that a same location of the same AM is used.

Optionally, the delay measurement unit 230 in the media conversion module 200 may also be a control unit outside the media conversion module 200. In an embodiment, the data stream bypassed from the network interface 210 may be input to a control unit, such as a CPU, outside the media conversion module 200 using another interface. The CPU records a delay during which the data stream passes through the service processing unit 220.

Figure 5:
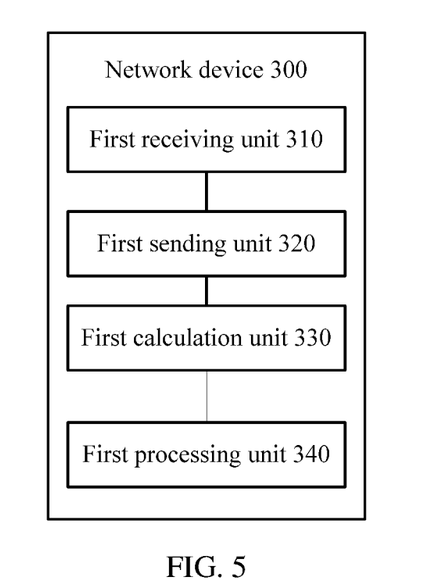
FIG. 5 is a schematic block diagram of a network device according to an embodiment of this application.

FIG. 5 is a schematic block diagram of a network device 300 according to an embodiment of this application. The network device is a first network device. As shown in FIG. 5, the network device 300 includes a first receiving unit 310 configured to receive a first packet using a first receiving interface of a media conversion module of the first network device, where the first packet includes a first AM, a first sending unit 320 configured to send a second packet using a first sending interface of the media conversion module, where the second packet includes the first AM, and the second packet is the first packet processed by the media conversion module, a first calculation unit 330 configured to calculate a time interval $T_1$ between a time at which the media conversion module receives the first packet including the first AM and a time at which the media conversion module sends the second packet including the first AM, where the first receiving unit 310 is further configured to receive a third packet using the first receiving interface, and the first sending unit 320 is further configured to send, using the first sending interface, the third packet processed by the media conversion module, and a first processing unit 340 configured to use the $T_1$ to compensate for a first timestamp at which the first network device receives or sends the third packet.

Therefore, the network device in this embodiment of this application records a time interval before and after a packet passes through the media conversion module, and uses the time interval to correct a timestamp of sending or receiving the packet. This can accurately determine the delay of the packet through internal processing of the media conversion module, and further improve synchronization performance of a 1588 protocol.

Optionally, in this embodiment of this application, the network device 300 further includes a second receiving unit configured to receive a fourth packet using a second receiving interface of the media conversion module, where the fourth packet includes a second AM, a second sending unit configured to send a fifth packet using a second sending interface of the media conversion module, where the fifth packet includes the second AM, and the fifth packet is the fourth packet processed by the media conversion module, a second calculation unit configured to calculate a time interval $T_2$ between a time at which the media conversion module receives the fourth packet including the second AM and a time at which the media conversion module sends the fifth packet including the second AM, where the second receiving unit is further configured to receive a sixth packet using the second receiving interface, the second sending unit is further configured to send, using the second sending interface, the sixth packet processed by the media conversion module, and a receiving direction and a sending direction of the third packet are opposite to those of the sixth packet, and a second processing unit configured to use the $T_2$ to compensate for a second timestamp at which the first network device receives or sends the sixth packet.

Optionally, in this embodiment of this application, the first calculation unit 330 is further configured to record a first moment when receiving the first packet using the first receiving interface and when determining that the first packet includes the first AM, record a second moment when sending the second packet using the first sending interface and when determining that the second packet includes the first AM, and determine a time interval between the first moment and the second moment as the time interval $T_1$.

Optionally, in this embodiment of this application, the first calculation unit 330 is further configured to start a counter at the first moment, stop the counter at the second moment, and obtain a count value N, where N is a positive integer and a clock cycle of the counter is t, and determine N*t as the $T_1$.

Optionally, in this embodiment of this application, the third packet is a packet that is sent by a first service chip of the first network device to a second network device using the media conversion module. The first processing unit 340 is further configured to use a sum of the first timestamp and the $T_1$ as a moment at which the first network device sends the third packet to the second network device, where the first timestamp is a moment at which the third packet arrives at the first receiving interface.

Optionally, in this embodiment of this application, the third packet is a packet that is sent by a second network device to a second service chip of the first network device using the media conversion module. The first compensation unit 340 is further configured to use a difference between the first timestamp and the $T_1$ as a moment at which the first network device receives the third packet, where the first timestamp is a moment at which the third packet arrives at the first sending interface.

Optionally, in this embodiment of this application, the third packet is a synchronization packet sent by the second network device to the first network device, where the synchronization packet carries a third timestamp at which the second network device sends the synchronization packet. The sixth packet is a delay request packet sent by the first network device to the second network device, where the second network device is a master device of the first network device, and the first network device is a slave device of the second network device. The network device further includes a first obtaining unit configured to obtain, from the synchronization packet, a moment $t_1$ at which the second network device sends the synchronization packet, where the first processing unit 340 is further configured to use a difference between the first timestamp and the $T_1$ as a moment $t_2$ at which the first network device receives the synchronization packet, the first timestamp is a moment at which the synchronization packet arrives at the first sending interface, the second processing unit is further configured to use a sum of the second timestamp and the $T_2$ as a moment $t_3$ at which the first network device sends the delay request packet, and the second timestamp is a moment at which the delay request packet arrives at the second receiving interface, a third receiving unit configured to receive a delay response packet sent by the second network device, where the delay response packet carries a fourth timestamp at which the second network device receives the delay request packet, a second obtaining unit configured to obtain, from the delay response packet, a moment $t_4$ at which the second network device receives the delay request packet, and a third calculation unit configured to calculate a time offset between the first network device and the second network device based on the $t_1$, the $t_2$, the $t_3$, and $t_4$.

Optionally, in this embodiment of this application, the media conversion module is an optical module.

The network device 300 in this embodiment of this application may correspond to the first network device in the method embodiment of this application. In addition, the foregoing and other operations and/or functions of the units in the network device 300 are respectively intended to implement the corresponding procedures of the method 100 in FIG. 3. For brevity, details are not described herein again.

Figure 6:
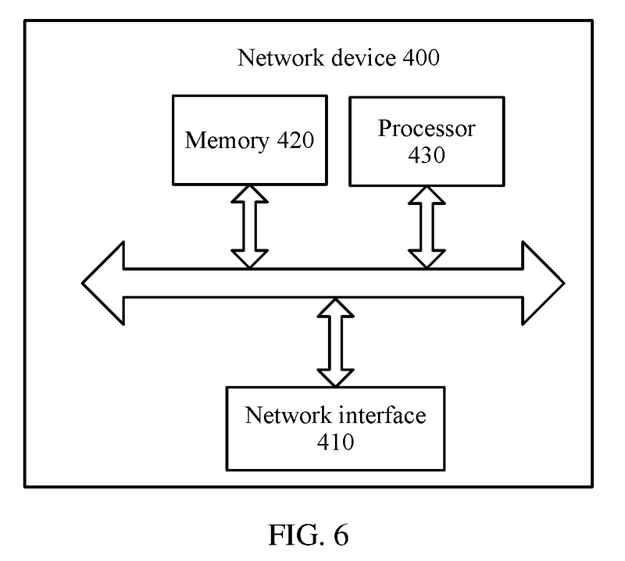
FIG. 6 is another schematic block diagram of a network device according to an embodiment of this application.

FIG. 6 is a schematic block diagram of a network device 400 for measuring a delay according to an embodiment of this application. The network device 400 is a first network device. As shown in FIG. 6, the network device 400 includes a network interface 410, a memory 420, and a processor 430. The network interface includes a receiving interface and/or a sending interface configured to receive or send a packet. The memory is configured to store an instruction. The processor is configured to control a first receiving interface of a media conversion module of the first network device to receive a first packet, where the first packet includes a first AM, control a first sending interface of the media conversion module to send a second packet, where the second packet includes the first AM, and the second packet is the first packet processed by the media conversion module, calculate a time interval $T_1$ between a time at which the media conversion module receives the first packet including the first AM and a time at which the media conversion module sends the second packet including the first AM, control the network interface to receive a third packet using the first receiving interface, and control the network interface to send, using the first sending interface, the third packet processed by the media conversion module, and use the $T_1$ to compensate for a first timestamp at which the first network device receives or sends the third packet.

Therefore, the network device in this embodiment of this application records a time interval before and after a packet passes through the media conversion module, and uses the time interval to correct a timestamp of sending or receiving the packet. This can accurately determine the delay of the packet through internal processing of the media conversion module, and further improve synchronization performance of a 1588 protocol.

It should be understood that, in this embodiment of this application, the processor 430 may be a CPU. The processor 430 may further be another general-purpose processor, a digital signal processor (DSP), an ASIC, a FPGA or another programmable logic device, a discrete gate or a transistor logic device, a discrete hardware component, or the like. The general-purpose processor may be a microprocessor, or the processor may be any conventional processor or the like.

The memory 420 may include a read-only memory and a random access memory, and provide an instruction and data to the processor 430. A part of the memory 420 may further include a non-volatile random access memory. For example, the memory 420 may further store information about a device type.

In an implementation process, content in the foregoing methods can be implemented using a hardware integrated logic circuit in the processor 430, or using instructions in a form of software. The content of the method disclosed with reference to the embodiments of this application may be directly performed by a hardware processor, or may be performed using a combination of hardware in the processor and a software module. A software module may be located in a mature storage medium in the art, such as a random access memory, a flash memory, a read-only memory, a programmable read-only memory, an electrically erasable programmable read-only memory, a register, or the like. The storage medium is located in the memory 420, and the processor 430 reads information in the memory 420 and completes the content in the foregoing methods in combination with hardware of the processor 430. To avoid repetition, details are not described herein again.

In a specific implementation, a first calculation unit, a second calculation unit, a third calculation unit, a first processing unit, a second processing unit, a first obtaining unit, and a second obtaining unit in the network device 300 may be implemented by the processor 430 in FIG. 6, and sending units and receiving units in the network device 300 may be implemented by the network interface 410 in FIG. 6.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the embodiments of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an embodiment. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory, a random-access memory, a magnetic disk, or an optical disc.

The foregoing descriptions are merely specific implementations of the embodiments of this application, but are not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application shall be subject to the protection scope of the claims.

What is claimed is:

1. A packet processing method, implemented by a first network device, comprising:
   receiving, a first packet using a first receiving interface of a media conversion module, wherein the first packet comprises a first alignment marker (AM), and wherein the first network device comprises the media conversion module;
   processing the first packet by the media conversion module to obtain a second packet;
   sending the second packet using a first sending interface of the media conversion module to a second network device, wherein the second packet comprises the first AM;
   calculating a time interval (T1) between a time at which the first packet is received and a time at which the second packet is sent;
   receiving a third packet using the first receiving interface;
   sending the third packet that is processed by the media conversion module to the second network device using the first sending interface, wherein the first network device uses the T1 to compensate for a first timestamp at which the first network device receives or sends the third packet.

2. The packet processing method of claim 1, further comprising:
   receiving a fourth packet using a second receiving interface of the media conversion module, wherein the fourth packet comprises a second AM;
   processing the fourth packet by the media conversion module to obtain a fifth packet;
   sending the fifth packet using a second sending interface of the media conversion module, wherein the fifth packet comprises the second AM;
   calculating a time interval (T2) between a time at which the fourth packet is received and a time at which the fifth packet is sent;
   receiving a sixth packet using the second receiving interface; and
   sending the sixth packet to a second receiving unit using the second sending interface, wherein a receiving direction and a sending direction of the third packet are opposite to those of the sixth packet, wherein the first network device uses the T2 to compensate for a second timestamp at which the first network device receives or sends the sixth packet.

3. The packet processing method of claim 1, wherein calculating the T1 comprises:
   recording a first moment when receiving the first packet using the first receiving interface and when determining that the first packet comprises the first AM;
   recording a second moment when sending the second packet using the first sending interface and when determining that the second packet comprises the first AM; and
   determining, by the first network device, a time interval between the first moment and the second moment as the time interval T1.

4. The packet processing method of claim 3, wherein determining the time interval between the first moment and the second moment as the T1 comprises:
   starting a counter at the first moment;
   stopping, by the first network device, the counter at the second moments;
   obtaining a count value N and a clock cycle of the counter t, wherein N is a positive integer; and
   determining N*t as the T1.

5. The packet processing method of claim 1,
   wherein the packet processing method further comprises:
   sending the third packet by a first service chip to a second network device using the media conversion module, wherein the first network device comprises the first service chip;
   using the T1 to compensate for the first timestamp at which the first network device sends the third packet; and
   using a sum of the first timestamp and the T1 as a moment at which the first network device sends the third packet to the second network device, wherein the first timestamp is a moment at which the third packet arrives at the first receiving interface.

6. The packet processing method of claim 1, wherein the packet processing method further comprises:
   receiving the third packet from a second network device by a second service chip using the media conversion module, wherein the first network device comprises the second service chip;
   using the T1 to compensate for the first timestamp at which the first network device receives the third packet; and
   using a difference between the first timestamp and the T1 as a moment at which the first network device receives the third packet, wherein the first timestamp is a moment at which the third packet is received at the first sending interface.

7. The packet processing method of claim 2, wherein the packet processing method further comprises:
   receiving the third packet as a synchronization packet from a second network device, wherein the synchronization packet carries a third timestamp at which the second network device sends the synchronization packet;
   sending the sixth packet as a delay request packet to the second network device, wherein the second network device is a master device of the first network device, wherein the first network device is a slave device of the second network device;
   obtaining, from the synchronization packet, a moment at which the second network device sends the synchronization packet; and using the T1 to compensate for the first timestamp at which the first network device receives the third packet further comprises:
using a difference between the first timestamp and the T1 as a moment (t2) at which the first network device receives the synchronization packet, wherein the first timestamp is a moment at which the synchronization packet arrives at the first sending interface; and
using the T2 to compensate for the second timestamp at which the first network device sends the sixth packet further comprises using a sum of the second timestamp and the T2 as a moment (t3) at which the first network device sends the delay request packet, wherein the second timestamp is a moment at which the delay request packet arrives at the second receiving interface; and
receiving a delay response packet from the second network device, wherein the delay response packet carries a fourth timestamp at which the second network device receives the delay request packet;
obtaining, by the first network device from the delay response packet, a moment (t4) at which the second network device receives the delay request packet from the delay response packet; and
calculating a time offset between the first network device and the second network device based on the t1, the t2, the t3, and the t4.

8. A network device comprising:
a network interface;
a media conversion module coupled to the network interface and comprising a first receiving interface and a first sending interface, wherein the media conversion module is configured to process a first packet to obtain a second packet;
a memory coupled to the network interface and configured to store instructions; and
a processor coupled to the network interface, the media conversion module and the memory and configured to execute the instructions to:
control a first receiving interface to receive the first packet, wherein the first packet comprises a first alignment marker (AM);
process the first packet to obtain a second packet;
control the first sending interface to send the second packet, wherein the second packet comprises the first AM;
calculate a time interval (T1) between a time at which the first packet comprising the first AM is received and a time at which the second packet comprising the first AM is sent;
control the network interface to receive a third packet using the first receiving interface;
control the first sending interface to send the third packet that is processed by the media conversion module; and
compensate for a first timestamp at which the network device receives or sends the third packet based on the T1.

9. The network device of claim 8, wherein the media conversion module further comprises a second receiving interface and a second sending interface, wherein the instructions further cause the network device to:
control the second receiving interface to receive a fourth packet, wherein the fourth packet comprises a second AM;
control the second sending interface to send a fifth packet, wherein the fifth packet comprises the second AM, wherein the fifth packet is the fourth packet processed by the media conversion module;
calculate a time interval (T2) between a time at which the fourth packet comprising the second AM is received and a time at which the fifth packet comprising the second AM is sent;
control the second receiving interface to receive a sixth packet;
control the second sending interface to send the sixth packet processed by the media conversion module, wherein a receiving direction and a sending direction of the third packet are opposite to those of the sixth packet; and
compensate for a second timestamp at which the network device receives or sends the sixth packet based on the T2.

10. The network device of claim 8, wherein the instructions further cause the network device to:
record a first moment when controlling the first receiving interface to receive the first packet and determining that the first packet comprises the first AM;
record a second moment when controlling the first sending interface to send the second packet and determining that the second packet comprises the first AM; and
determine a time interval between the first moment and the second moment as the T1.

11. The network device of claim 10, wherein the instructions further cause the network device to:
start a counter at the first moment;
stop the counter at the second moment;
obtain a count value N and a clock cycle of the counter is t, wherein N is a positive integer; and
determine N*t as the T1.

12. The network device of claim 8, wherein the instructions further cause the network device to:
send the third packet by a first service chip to a second network device using the media conversion module, wherein the network device comprises the first service chip; and
use a sum of the first timestamp and the T1 as a moment at which the network device sends the third packet to the second network device, and wherein the first timestamp is a moment at which the third packet arrives at the first receiving interface.

13. The network device of claim 8, wherein the instructions further cause the network device to:
receive the third packet from a second network device at a second service chip using the media conversion module, wherein the network device comprises the second service chip; and
use a difference between the first timestamp and the T1 as a moment at which the network device receives the third packet, and wherein the first timestamp is a moment at which the third packet arrives at the first sending interface.

14. The network device of claim 9, wherein the instructions further cause the network device to:
receive the third packet as a synchronization packet from a second network device, wherein the synchronization packet carries a third timestamp at which the second network device sends the synchronization packet;
send the sixth packet as a delay request packet to the second network device, wherein the second network device is a master device of the network device, wherein the network device is a slave device of the second network device;

obtain, from the synchronization packet, a moment at which the second network device sends the synchronization packet;

use a difference between the first timestamp and the T1 as a moment (t2) at which the network device receives the synchronization packet, wherein the first timestamp is a moment at which the synchronization packet arrives at the first sending interface; and use a sum of the second timestamp and the T2 as a moment (t3) at which the network device sends the delay request packet, wherein the second timestamp is a moment at which the delay request packet arrives at the second receiving interface;

control the first receiving interface to receive a delay response packet from the second network device, wherein the delay response packet carries a fourth timestamp at which the second network device receives the delay request packet;

obtain, from the delay response packet, a moment (t4) at which the second network device receives the delay request packet; and calculate a time offset between the network device and the second network device based on the t1, the t2, the t3, and the t4.

15. A computer program product comprising computer-executable instructions stored on a non-transitory computer-readable medium that, when executed by a processor of a network device, cause the network device to:

control a first receiving interface of a media conversion module to receive a first packet, wherein the first packet comprises a first alignment marker (AM), and wherein the network device comprises the media conversion module;

process the first packet using the media conversion module to obtain a second packet;

control a first sending interface of the media conversion module to send the second packet, wherein the second packet comprises the first AM;

calculate a time interval (T1) between a time at which the first packet comprising the first AM is received and a time at which the second packet comprising the first AM is sent;

control a network interface to receive a third packet using the first receiving interface, and control the first sending interface to send the third packet processed by the media conversion module; and compensate for a first timestamp at which the network device receives or sends the third packet based on the T1.

16. The computer program product of claim 15, wherein the computer-executable instructions further cause the network device to:

control a second receiving interface of the media conversion module to receive a fourth packet, wherein the fourth packet comprises a second AM;

control a second sending interface of the media conversion module to send a fifth packet, wherein the fifth packet comprises the second AM, wherein the fifth packet is the fourth packet processed by the media conversion module;

calculate a time interval (T2) between a time at which the the fourth packet comprising the second AM is received and a time at which the fifth packet comprising the second AM is sent;

control the second receiving interface to receive a sixth packet;

control the second sending interface to send the sixth packet processed by the media conversion module, wherein a receiving direction and a sending direction of the third packet are opposite to those of the sixth packet; and compensate for a second timestamp at which the network device receives or sends the sixth packet based on the $T_2$.

17. The computer program product of claim 15, wherein the computer-executable instructions further cause the network device to:

record a first moment when controlling the first receiving interface to receive the first packet and determining that the first packet comprises the first AM;

record a second moment when controlling the first sending interface to send the second packet and determining that the second packet comprises the first AM; and determine a time interval between the first moment and the second moment as the T1.

18. The computer program product of claim 17, wherein the computer-executable instructions further cause the network device to be configured to:

start a counter at the first moment;

stop the counter at the second moment;

obtain a count value N and a clock cycle of the counter is t, wherein N is a positive integer; and determine N*t as the T1.

19. The computer program product of claim 15, wherein the computer-executable instructions further cause the network device to:

send the third packet by a first service chip to a second network device using the media conversion module, wherein the network device comprises the first service chip; and use a sum of the first timestamp and the T1 as a moment at which the network device sends the third packet to the second network device, and wherein the first timestamp is a moment at which the third packet arrives at the first receiving interface.

20. The computer program product of claim 15, wherein the computer-executable instructions further cause the network device to use a difference between the first timestamp and the T1 as a moment at which the network device receives the third packet, and wherein the first timestamp is a moment at which the third packet arrives at the first sending interface.

* * * * *

UNITED STATES PATENT AND TRADEMARK OFFICE
CERTIFICATE OF CORRECTION

PATENT NO. : 11,245,483 B2  
APPLICATION NO. : 16/797225  
DATED : February 8, 2022  
INVENTOR(S) : Jinhui Wang et al.

Page 1 of 1

It is certified that error appears in the above-identified patent and that said Letters Patent is hereby corrected as shown below:

In the Claims

Claim 3, Column 18, Line 10: "determining, by the first network device, a time" should read "determining a time"

Claim 3, Column 18, Lines 11 and 12: "moment as the time interval T1." should read "moment as the T1."

Claim 4, Column 18, Line 17: "stopping, by the first network device, the counter" should read "stopping the counter"

Claim 4, Column 18, Line 18: "second moments;" should read "second moment"

Claim 7, Column 18, Line 65: "a moment at" should read "a moment (t1) at"

Claim 7, Column 19, Lines 22 and 23: "obtaining, by the first network device from the delay response packet, a moment" should read "obtaining a moment"

Claim 14, Column 21, Line 1: "a moment at" should read "a moment (t1) at"

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*